(12) United States Patent
Le et al.

(10) Patent No.: US 7,565,732 B2
(45) Date of Patent: Jul. 28, 2009

(54) METHOD OF MANUFACTURING A WRITE POLE

(75) Inventors: Quang Le, San Jose, CA (US); Howard Zolla, San Jose, CA (US); Nian-Xiang Sun, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 589 days.

(21) Appl. No.: 10/931,649

(22) Filed: Aug. 31, 2004

(65) Prior Publication Data

US 2006/0044681 A1 Mar. 2, 2006

(51) Int. Cl.
G11B 5/187 (2006.01)
G11B 5/23 (2006.01)

(52) U.S. Cl. .............. 29/603.15; 29/603.12; 29/603.13; 216/22; 216/41; 216/47; 204/192.34; 360/317; 360/318; 360/319

(58) Field of Classification Search ............. 29/603.07, 29/603.12, 603.13, 603.14, 603.15, 603.16, 29/603.18; 216/22, 41, 47; 204/192.34; 360/317, 318, 319, 322
See application file for complete search history.

(56) References Cited

U.S. PATENT DOCUMENTS

| | | | | |
|---|---|---|---|---|
| 5,075,956 | A * | 12/1991 | Das ........................ | 29/603.14 |
| 6,470,566 | B2 | 10/2002 | Hsiao et al. ............... | 29/603.13 |
| 6,564,445 | B1 * | 5/2003 | Hashimoto et al. ....... | 29/603.14 |
| 6,660,640 | B1 | 12/2003 | Miller et al. ............... | 438/693 |
| 6,694,604 | B2 | 2/2004 | Santini ..................... | 29/603.14 |
| 2002/0071208 | A1 | 6/2002 | Batra et al. ................. | 360/125 |
| 2002/0162791 | A1 | 11/2002 | Jacobson ................... | 210/483 |
| 2003/0137779 | A1 | 7/2003 | Santini et al. .............. | 360/317 |
| 2003/0193740 | A1 | 10/2003 | Kruger et al. .............. | 360/125 |
| 2004/0027716 | A1 | 2/2004 | Chen et al. ................. | 360/126 |
| 2004/0085674 | A1 | 5/2004 | Han et al. ................... | 360/126 |
| 2004/0241983 | A1 | 12/2004 | Kim et al. | |
| 2004/0248414 | A1 | 12/2004 | Tsai et al. | |
| 2004/0253461 | A1 | 12/2004 | Ogihara et al. | |
| 2004/0266204 | A1 | 12/2004 | Lim et al. | |
| 2005/0037291 | A1 | 2/2005 | Nitta et al. | |

FOREIGN PATENT DOCUMENTS

JP 11213347 A * 8/1999

OTHER PUBLICATIONS

"Perpendicular Magnetic Recording: Writing Process"; May 2004; Journal of Applied Physics; vol. 95; #9.
Hitachi Global Storage Technologies; "Recording Head/Perpendicular Recording"; http://www.hitachigst.com/hdd/research/recording_head/pr/; 2 pgs.
Tagawa et al.; "HighPerformance Write Head Design and Materials"; Dec. 2001; Fujitsu Sci. Tech. J., 37,2, pp. 164-173.
Mark H. Kryder; An Introduction to Magnetic Recording Heads; Seagate Research, 2403 Sidney St., Pittsburgh, PA 15211, USA.
Koji Matsumoto; "Perpendicular Magnetic Recording Using Magneto-Optical Media"; Dec. 2001; Fujitsu Sci. Tech. J., 37,2, pp. 155-163.

* cited by examiner

*Primary Examiner*—A. Dexter Tugbang

(57) ABSTRACT

A method of fabricating a magnetic write head, in accordance with one embodiment, includes forming a beveled write pole. A conformal spacer may be formed upon a portion of a flare length proximate a tip of the write pole. A shield layer may also be formed upon the conformal spacer adjacent the flare length proximate the tip of the write pole.

8 Claims, 7 Drawing Sheets

METHOD OF MANUFACTURING A WRITE POLE

BACKGROUND OF THE INVENTION

Magnetic heads are used in disk drives to write information on to a moving magnetic media and to read the information stored thereon. Conventional magnetic heads include a write head and a read head. A write head should be capable of writing straight and sharp transitions. The write head should also be capable of writing the data on a given track without reducing the signal of adjacent or nearby tracks.

The write head may implement a longitudinal recording mode or a perpendicular recording mode for magnetically encoding data on a disk. A longitudinal write head, in accordance with the conventional art, is depicted in FIG. 1A. In longitudinal recording, a coil 105 wound around a toroid 110 generates a magnetic flux. The fringe field 115 proximate a gap in the toroid 110 causes orientation of a magnetic recording layer 120, having a horizontally orientated magnetic domain, on a disk as a function of the current through the coil 105.

A perpendicular write head, in accordance with the conventional art, is depicted in FIG. 1B. In perpendicular recording, a current flowing in the coil 155 creates a magnetic flux in a write pole 160. The magnetic flux 165 passes from the tip of the write pole 160, perpendicularly through the magnetic recording layer 170, having vertically orientated magnetic domain, and into a soft underlay 175. The bit cell recorded on the magnetic recording layer has a width representing track-width, a length representing linear density and a depth that provides the volume necessary to provide sufficient magnetization to be read by a sensor of the read head.

The areal density achievable by a write head is a product of the linear bit density and the track density. The linear bit density is the number of bits that can be written per linear inch along the track of the rotating magnetic disk. The track width density is the number of tracks that can be written per inch along a radius of the disk. The linear bit density depends upon the length of the bit along a track and the track-width density is dependent upon the width of the pole tip.

A perpendicular recording magnetic disk is thicker than a longitudinal disk and therefore provides sufficient magnetization for a bit cell having a decreased width and or length. Accordingly, the width and the length of the write probe at the tip (e.g., air bearing surface) can be reduced to increase the track-width density and/or linear bit density.

The flux field generated by the write pole is dependent upon the flare length, the flare point, the trailing edge and other structures of the write pole. Simultaneously controlling the flare point and control the track-width of the write pole, utilizing conventional methods of fabrication, such as ion milling, is problematic. Thus, reducing the width and/or length of the write pole tip may create a magnetic field adjacent to the bit but outside of the track in which the writing process is taking place, thereby corrupting the bits on adjacent tracks. Similarly, it becomes more difficult to simultaneously maintain the planarity of the trailing edge of the write pole as the width and/or length is decreased using an ion mill approach. A reduction in the quality of the trailing edge may reduce the quality of the linear transition between each bit. Accordingly, what is needed is a write pole structure characterized by a flux field having an improved field gradient to write into high coercivity media while minimizing adjacent track interference (ATI).

SUMMARY OF THE INVENTION

Embodiments of the present invention are directed toward a write head for generating an improved flux field while minimizing adjacent track interference (ATI) and a manufacturable method of constructing the same. In one embodiment, a method of fabricating a magnetic write head includes forming a beveled write pole. A conformal spacer may be formed upon a portion of a flare length proximate a tip of the write pole. A shield layer may also be formed upon the conformal spacer adjacent the flare length proximate the tip of the write pole.

In another embodiment, a write pole includes a write pole having a leading edge, a trailing edge and side edges. The write pole may also include a spacer formed proximate the side edges of the write pole. The write pole may also include a shield aligned to the side edges of the write pole by the spacer. The shield may be spaced apart from a flare point and/or yoke of the write pole by the spacer.

In yet another embodiment, a method of fabricating a magnetic write head includes depositing a first hard mask layer on a layer of magnetic material, depositing a second hard mask layer on the first hard mask layer, depositing a third hard mask layer on the second hard mask layer and forming a soft mask upon the third hard mask layer defining a write pole. The third hard mask layer exposed by the soft mask is etched utilizing a first chemistry, wherein the pattern of the write pole is transferred from the soft mask to the third hard mask. The second and first hard mask layers exposed by the patterned third hard mask are etched utilizing a second chemistry thereby forming a first and second hard mask wherein the pattern of the write pole is transferred from the third hard mask to the first hard mask. The layer of magnetic material exposed by the first hard mask is milled such that a beveled write pole is formed.

Embodiments of the present invention provide a single-pole write head including a beveled write pole with a leading edge tapering and/or an aggressive flare-point throat height. The single-pole write head may also include a self-aligned side and trailing shield. The beveled write pole and/or write pole with a self-aligned side and trailing edge shield is adapted to generate a flux field for perpendicular recoding at densities between approximately 1 gigabit per square inch and 1 terabit per square inch or more. The flux field has an improved field gradient for minimizing adjacent track interference. Embodiments of the invention also provide a manufacturable method of constructing the write head.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the invention, numerous specific details are set forth in order to provide a thorough understanding of the present invention. However, it is understood that the invention may be practiced without these specific details. In other instances, well-known methods, procedures, components, and circuits have not been described in detail as not to unnecessarily obscure aspects of the invention. For example, it is appreciated that the write head is a portion of an integrated read/write perpendicular magnetic recording apparatus. However, embodiments of the present invention pertain to the write head and thus the read head, coil and other conventional structures of the perpendicular magnetic recording apparatus are not described so as not to unnecessarily obscure aspects of the invention.

Embodiments of the present invention provide a novel and manufacturable single-pole write head. The single-pole write head may include a beveled write pole with a leading edge tapering and/or an aggressive flare-point throat height. The single-pole write head may also include a self-aligned side and trailing shield. The embodiments of the present invention and their benefits are further described below.

Figure 1A:
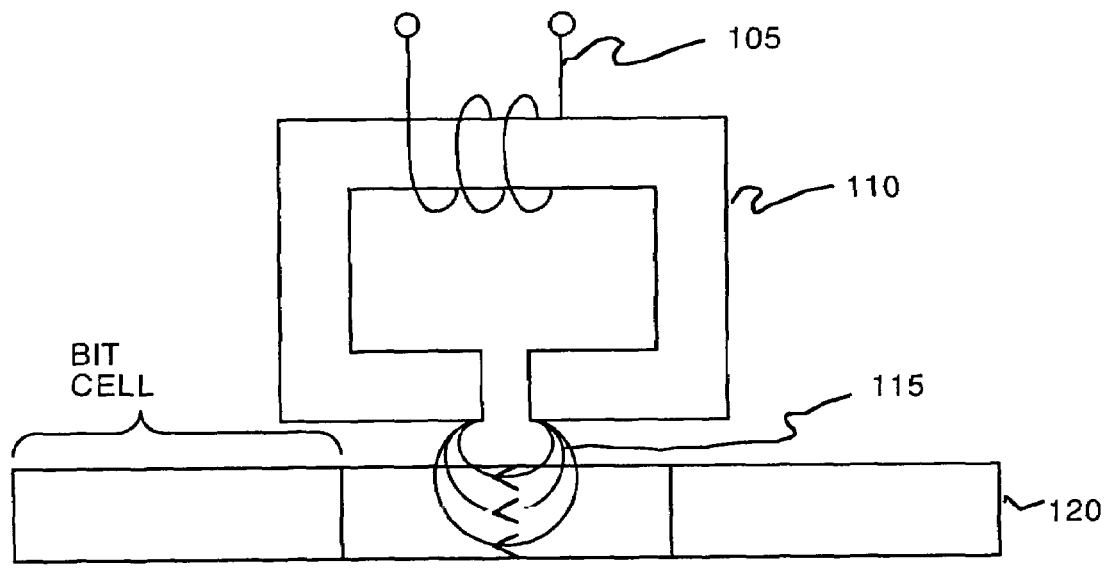
FIG. 1A shows a longitudinal write head, in accordance with the conventional art.
Figure 1B:
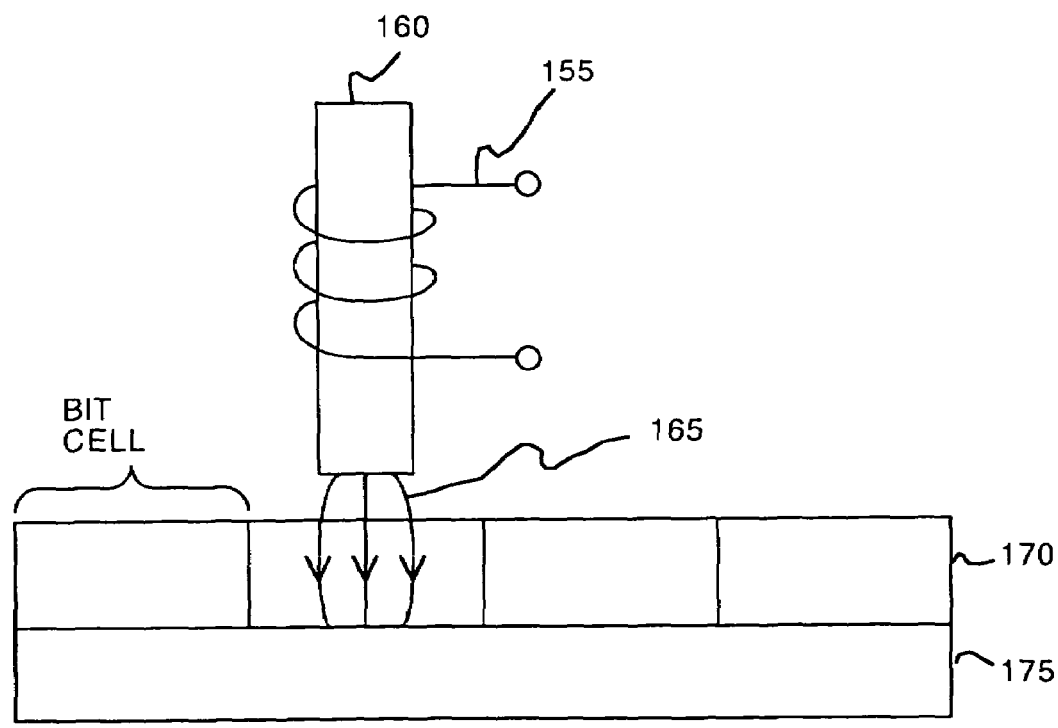
FIG. 1B shows a perpendicular write head, in accordance with the conventional art.
Figure 2A:
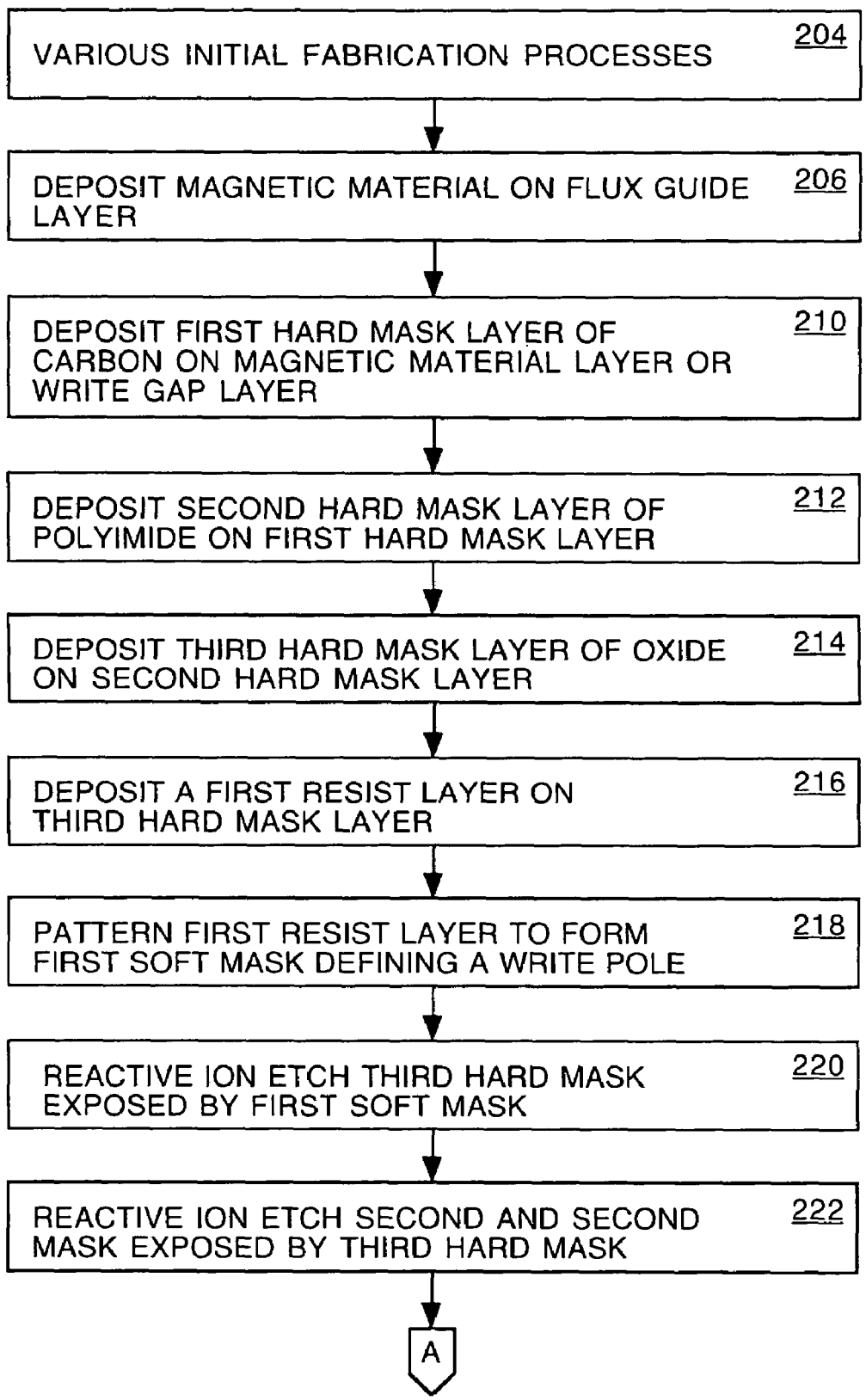
FIGS. 2A, and 2B show a flow diagram of a method of fabricating a write head, in accordance with one embodiment of the present invention.
Figure 2B:
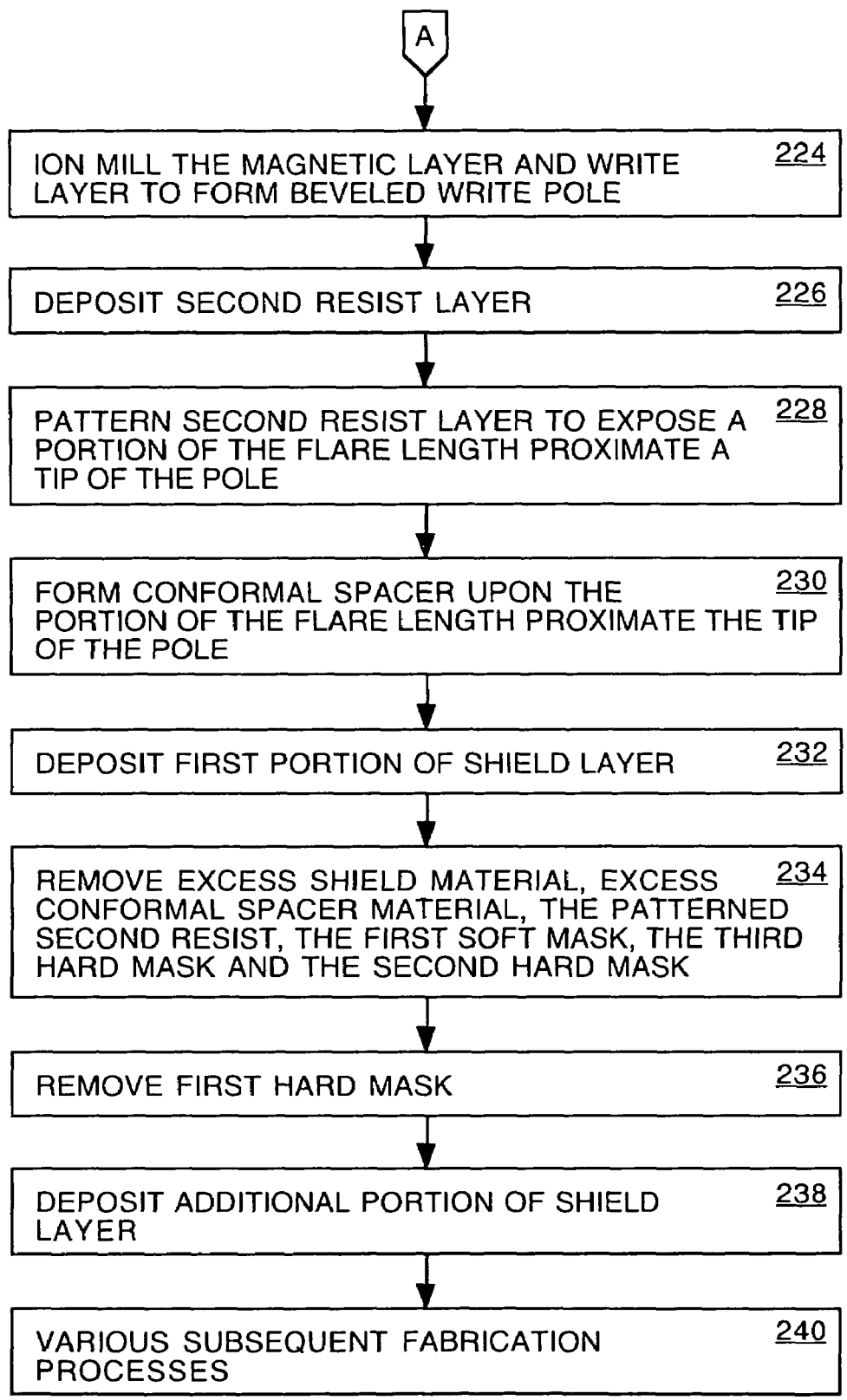
Figure 3A:
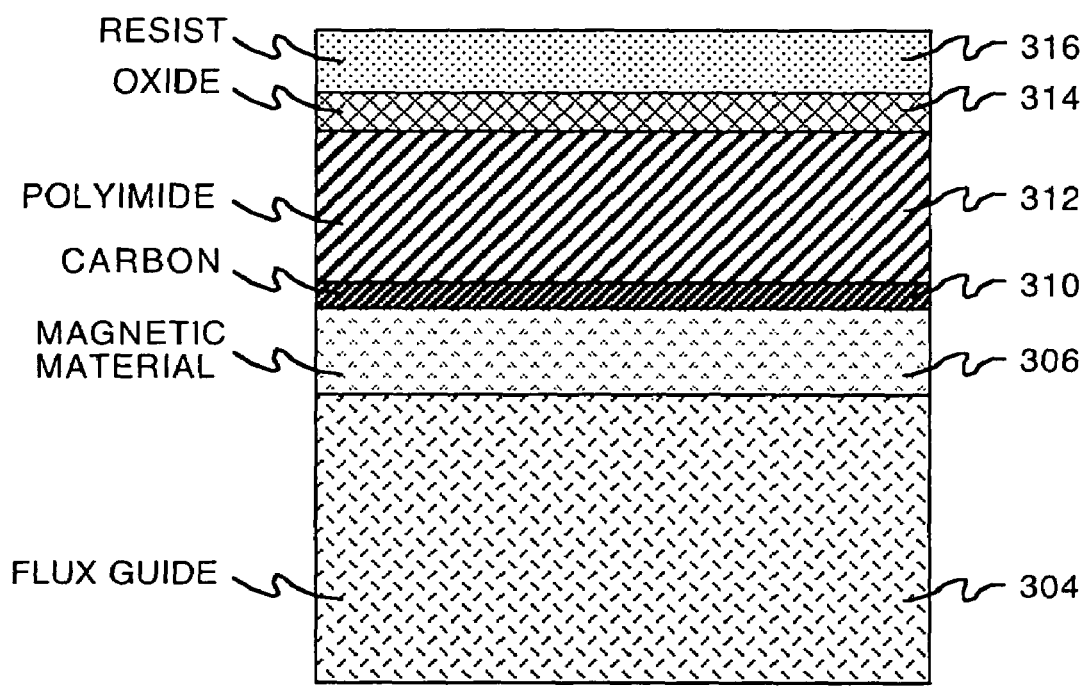
FIGS. 3A, 3B, 3C, 3D, 3E and 3F show block diagrams of a write head during various stages of fabrication, in accordance with one embodiment of the present invention.
Figure 3B:
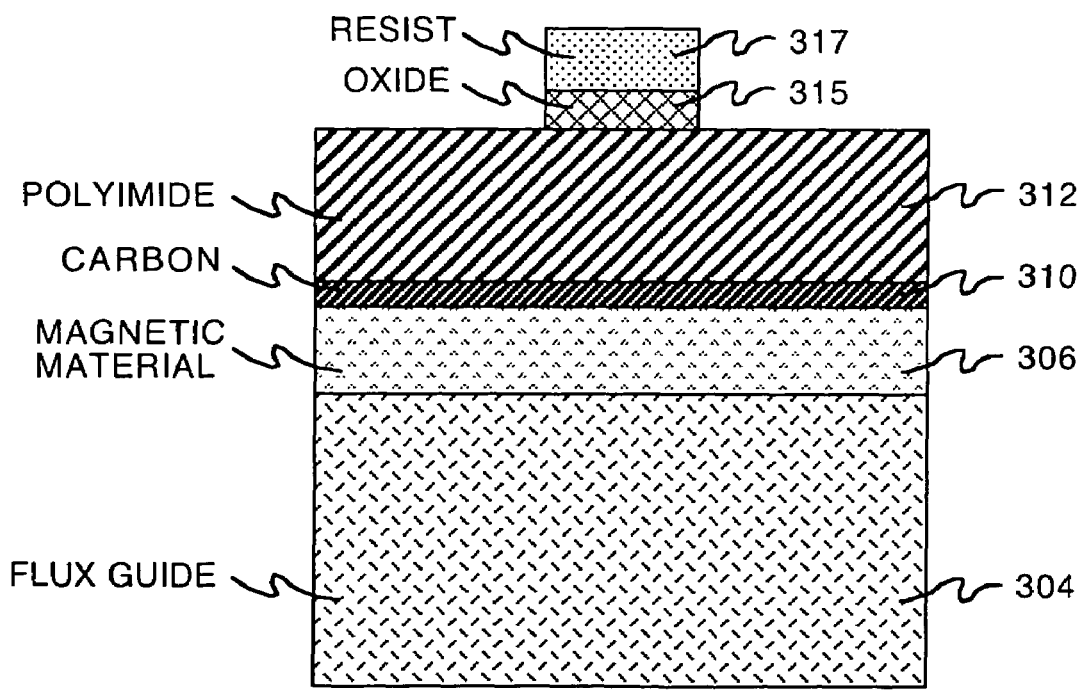
Figure 3C:
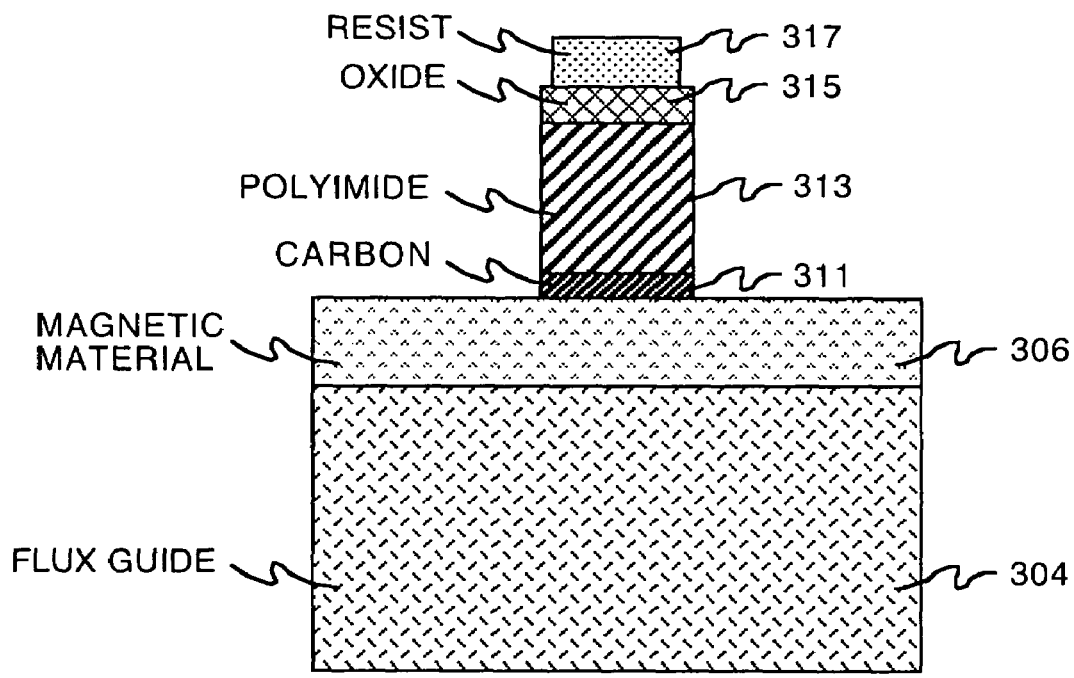
Figure 3D:
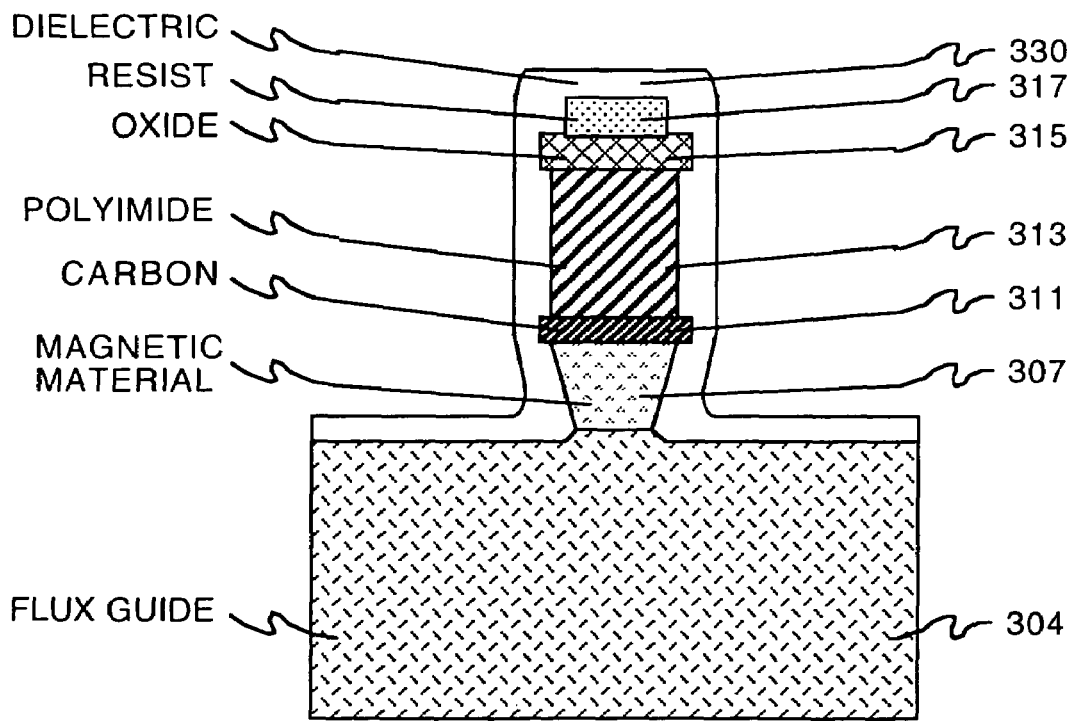
Figure 3E:
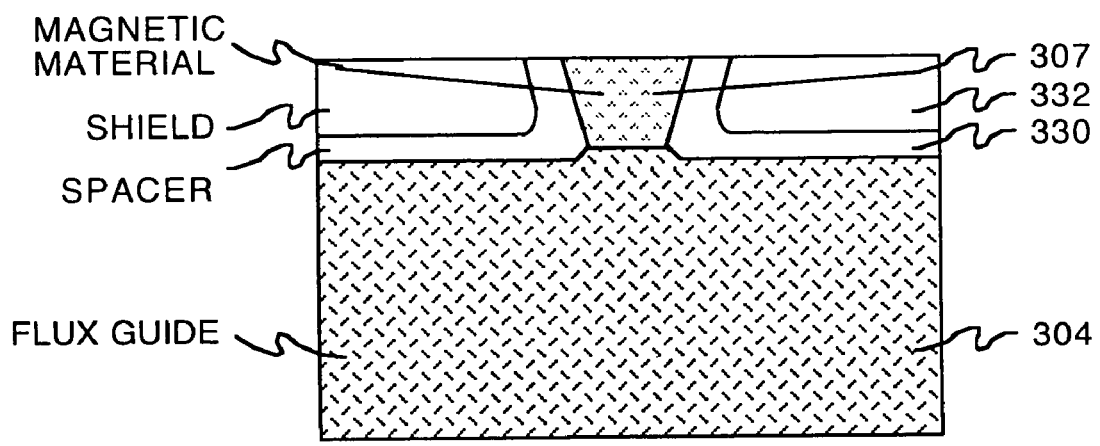
Figure 3F:
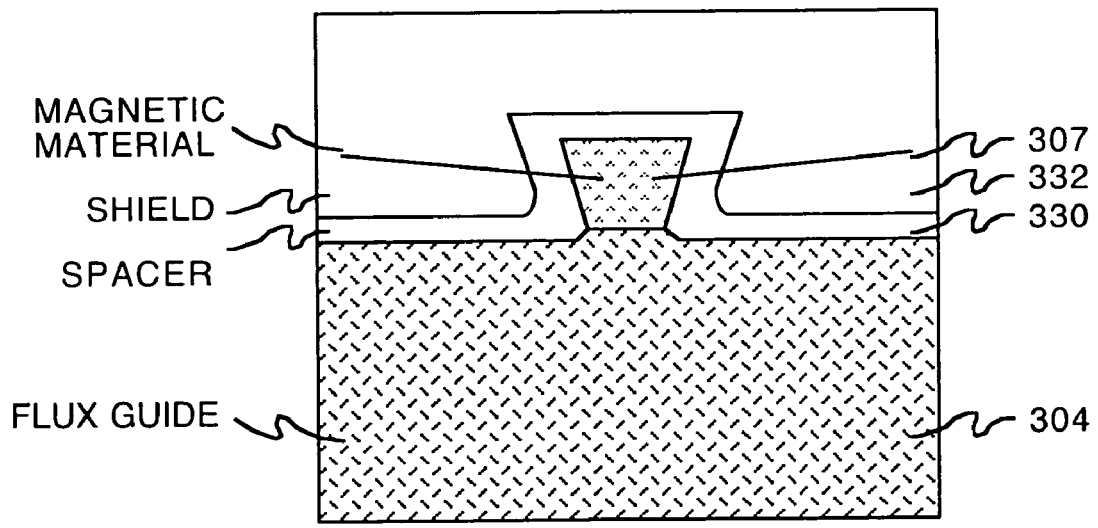

Referring now to FIGS. 2A and 2B, a flow diagram of a method of fabricating a write head, in accordance with one embodiment of the present invention, is shown. The method of fabricating the write head is illustrated in the block diagrams of FIGS. 3A, 3B, 3C, 3D, 3E and 3F. As depicted in FIGS. 2A, 2B, 3A, 3B, 3C, 3D, 3E and 3F, the method includes performing various initial fabrication processes upon a wafer, at 204. In one implementation, the initial fabrication processes may include cleaning, depositing, plating, photolithography, etching and/or the like.

At 206, a layer of magnetic moment material 306 is formed upon a flux guide layer 304. In one implementation, a full-film of laminated high magnetic moment material 306, such as Cobalt (Co), Iron (Fe), Chromium (Cr), Nickel (Ni) or their alloys may be deposited. An exemplary thickness of the laminated high magnetic moment material 306 may be approximately 240-310 nanometers (nm).

At 210, a first hard mask layer 310 having a first etching selectivity is formed upon the layer of magnetic moment material 306. In one implementation, the first hard mask layer 310 may be a CVD deposited layer of carbon. An exemplary thickness of the carbon layer may be approximately 20-35 nm.

At 212, a second hard mask layer 312 having a second etching selectivity is formed upon the first hard mask layer 310. In one implementation, the second hard mask layer 312 may be a spun-on layer of polyimide, such as DURIMIDE available from Arch Chemicals of Norwalk, Conn. An exemplary thickness of the DURIMIDE layer may be approximately 0.8 micrometers (μm). At 214, a third hard mask layer 314 having a third etching selectivity is formed upon the second hard mask layer 312. In one implementation, the third hard mask layer 314 may be a CVD deposited layer of oxide. An exemplary thickness of the oxide layer may be approximately 100-150 nm.

At 216, a first resist layer 316 is formed upon the third hard mask layer 314. An exemplary thickness of the photo-resist layer 316 may be approximately 0.15-03 μm. At 218, the first resist layer 316 is patterned to form a first soft mask 317 defining a write head. The defined write head may include a write pole yoke, a write pole flare point, a write pole flare length and optionally a write pole termination pad. In one implementation, any conventional deep ultraviolet lithography or e-beam photolithography process may be utilized to pattern the first soft mask 317.

At 220, a first etching process is performed wherein the portions of the third hard mask layer 314 exposed by the first soft mask 317 are removed. The first etching process transfers the pattern of the first soft mask 317 (e.g., the pattern of the write head) into the third hard mask layer 314 to form a third hard mask 315. In one implementation, a fluorine-carbon chemistry based reactive ion etching (RIE) process may be utilized to etch the oxide layer. It is appreciated that selectivity of the first etching process should favor the second hard mask layer over the first soft mask 317.

At 222, a second etching process is performed wherein the portions of the second hard mask layer 312 and the first hard mask layer 310 exposed by the third hard mask 315 are removed. The second etching process transfers the pattern of the third hard mask 315 (e.g., the pattern of the write head) into the second hard mask layer 312 and the first hard mask layer 310 to form a second hard mask 313 and first hard mask 311. In one implementation, an oxygen-carbon chemistry based reactive ion etching process may be utilized to etch the polyimide and carbon layers. It is appreciated the selectivity of the second etching process should favor the first hard mask over the second hard mask. Furthermore, the thickness of the first hard mask may be increased to improve track width control and trailing edge definition (e.g., planarity) control during the second etching process. In another implementation, if the thickness of magnetic moment material layer 306 is sufficiently thin, the third hard mask layer 314 may be omitted and the first etching process 220 may be omitted to simplify the RIE step to one. In this case, the first resist layer 316 should contain silicon (e.g., a silicon containing resist) for better RIE selectivity.

At 224, a third etching process is performed wherein the portions of the layer of magnetic moment material 306 exposed by the first hard mask 311 are removed. In one implementation, an ion milling process may be utilized to etch the layer of magnetic moment material 306 to form the write pole 307. Ion milling may be utilized to bevel the write pole 307 such that the width of the leading edge is less than the width of the trailing edge of the write pole. Iteratively ion milling in a sweeping and rotating configuration enables accurate track width control (e.g., width of the trailing edge) while producing a well-defined flare point of the write head. It is appreciated that the second hard mask contributes to the patterning of the first hard mask and also offers additional milling resistance to define the write pole during ion milling for improved track width control and trailing edge definition control. The first and second hard mask also enables the ability to extend the ion milling process into the flux guide layer, such that a pedestal is formed.

At 226, a second resist layer is deposited. At 228, the second resist layer is patterned to expose a portion of the flare length proximate a tip of the write pole 307. It should be noted that the second resist layer is also used to lithographically define the pattern and the edge placement of the side and trailing shields. This layer may consist of a bi-layer where the bottom layer is an anti-reflective layer (BARC) such as silicon oxynitride ($SiO_xN_y$) to minimize reflective notching for better critical dimension control. Furthermore, the silicon oxynitride film may optionally be made thicker to define the shield's back edge placement for improved critical dimension control. The patterned second resist layer should cover the yoke portion of the write pole, the flare point of the write pole, a portion of the flare length proximate the flare point and other portions of the write head (not shown). Reactive ion etching (RIE) is used to transfer lithographical patterned resist into the silicon oxynitride layer.

At 230, a conformal spacer 330 is formed upon the portion of the write pole 307 exposed by the patterned second resist layer. The conformal spacer 330 may be a non-magnetic material such as aluminum oxide ($Al_2O_3$), silicon oxide ($SiO_2$), silicon nitride ($Si_3N_4$), tungsten (W), silicon oxynitride ($SiO_xN_y$), tantalum (Ta), Rhodium (Rh), Ruthenium (Ru) or the like. In one implementation, the non-magnetic material may be deposited utilizing atomic layer deposition (ALD), pulsed-atomic layer deposition, low-pressure chemical deposition process (LPCVD), plasma enhanced chemical vapor deposition (PECVD), high-density plasma deposition (HDPD) or similar chemical vapor deposition process. In one implementation, the conformal spacer 328 may be approximately 20-45 nm thick.

At 232, a first portion of a shield layer 332 is deposited. The shield layer 332 may be a plated high magnetic material, such as Nickel Iron (NiFe). In one implementation, the shield layer 332 may be approximately 0.3-1.0 µm thick. The shield layer 332 forms a self-aligned shield proximate the sides of the write pole 307. The conformal spacer 330 is adapted to provide aggressive alignment and spacing between the write pole 307 and the shield 332. It is appreciated that if the third etching process is extended into the flux guide layer (e.g., formation of a pedestal) the conformal spacer 330 may extend below the write pole 307 and therefore the shield layer 332 may wrap the entire sides of the write pole 307.

At 234, the excess shield layer 330 material, excess conformal spacer 328 material, the patterned second resist, the first soft mask 317, the third hard mask 315, and the second hard mask 313 may be removed. In one implementation, the excess shield layer 330 material, excess conformal spacer 328 material, the patterned second resist, the first soft mask 317, the third hard mask 315, and the second hard mask 313 may be removed utilizing a chemical mechanical polishing (CMP) process. The CMP process may be stopped on the first hard mask 311. It is appreciated that the second resist may have a similar material property as the first second and/or third hard mask layers such that the materials have substantially similar CMP rates. Furthermore, the thickness of the first hard mask may be increased to improve track width control and trailing edge definition (e.g., planarity) control during the CMP process.

At 236, a fourth etching process is performed wherein the first hard mask 311 is removed. In one implementation, an oxygen-carbon chemistry based reactive ion etching process may be utilized to etch the first hard mask 311. The fourth etching process result in a highly planar trailing edge of the write pole tip, such that increased transitional sharpness is obtained when writing data to a magnetic disk.

At 240, the fabrication of the write head continues with various subsequent fabrication processes. In one implementation, the subsequent fabrication processes may include cleaning, depositing, etching and/or the like.

It is appreciated that the above-described embodiment may readily be modified to form a single-pole write head having a self-aligned wrap-around side and trailing edge shield. At optional process 208, spacer material layer may be formed upon the layer of magnetic moment material 306. In one implementation, a non-magnetic material, which may be a conductor or an insulator, is deposited. In one implementation, the thickness of the spacer material layer may be approximately 20-45 nm. The third etching process at 224 acts to pattern the spacer material layer to form a trailing edge conformal spacer. It is also appreciated that the conformal spacer formed at 330 combines with the trailing edge conformal spacer to form a wrap-around conformal side and trailing edge spacer.

An optional process 238, an additional shield layer may be formed upon the remaining shield layer 332 and the remaining conformal spacer 330. After CMP, a thin non-magnetic conductive layer, such a tantalum (Ta) or Ruthernium (Ru), may be deposited. This layer serves two purposes: trailing shield gap and seed-layer for plating. Tantalum provides for good adhesion to the write pole, and Ruthenium (Ru) provide for a thin (e.g., 3 nm) plating seed-layer. It is also appreciated that tantalum and Ruthenium do not readily oxidize. The additional shield layer forms a self-aligned shield 332 proximate the trailing edge of the write pole 307, and combines with the remaining first portion of the shield layer to form a wrap-around shield design. In one implementation, the Ta/Ru seed-layer is deposited follow by removal of a portion of the Ta/Ru thin film to expose the conformal spacer 330 for magnetic connection of the conformal spacer 330 to the shield layer 332. This is followed by photolithography utilizing a bi-layer with BARC, such as silicon oxynitride, RIE to remove the silicon oxynitride exposed by the patterned resist, and plating of magnetic material, such as Nickel Iron, to create the trailing edge shield.

In another embodiment, a frame platting process, instead of the above-described laminate process, may be utilized to form the write pole. More specifically, the following processes may be substituted for the above-described processes 204-222 for fabricating the write head. A seed layer, such as nickel iron (NiFe) is sputtered on the flux guide layer. A first photo-resist is deposited upon the seed layer and patterned to roughly define the write pole. The pole piece is then plated in the opening in the first photo-resist layer up to a desired height. The resist is stripped and the un-plated portion of the seed-layer is removed. A second resist layer is deposited and patterned to expose a portion of the flare length proximate a tip of the write pole. A conformal spacer is formed upon the portion of the write pole exposed by the patterned second resist layer. A shield layer is deposited to form either self-aligned side shields or a self-aligned wrap-around side and trailing edge shield. The conformal spacer is adapted to provide aggressive alignment and spacing between the write pole and the shield.

It is appreciated that the above-described embodiments for forming a single-pole write head having self-aligned side shields may be combined with conventional methods of forming a trialing edge shield. Accordingly, a single-pole write head having self-aligned side shields and a separate trailing edge shield.

Figure 4A:
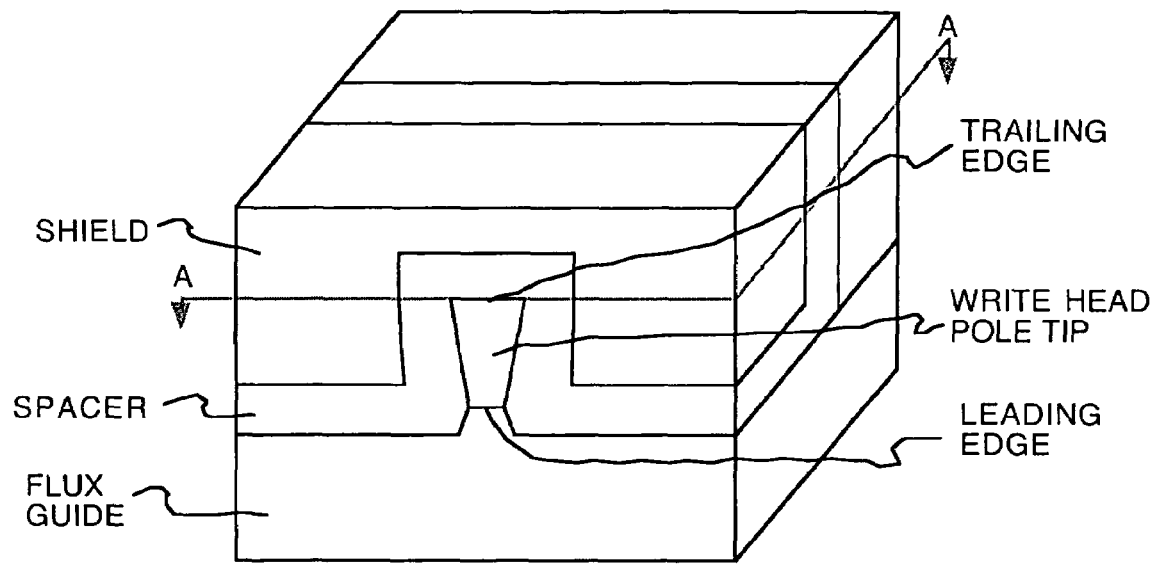
FIGS. 4A and 4B show perspective views of a portion of a perpendicular magnetic write head, in accordance with one embodiment of the present invention.
Figure 4B:
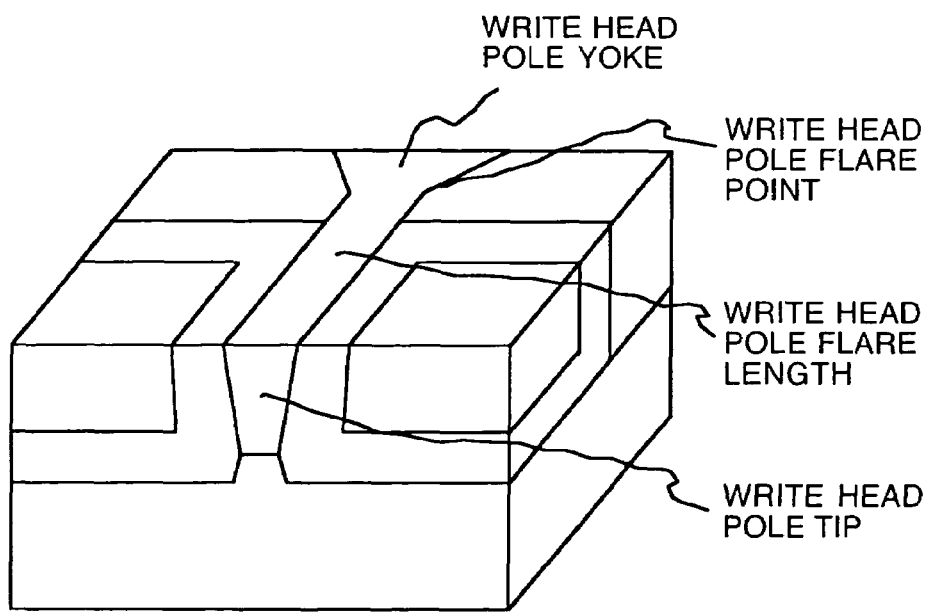

Referring now to FIGS. 4A and 4B, perspective views of a portion of a perpendicular magnetic write head, in accordance with one embodiment of the present invention, is shown. FIG. 4B is a sectional view of the portion of the write head of FIG. 4A along section line A-A. The write head includes a write pole and a shield. The write pole includes a write pole yoke, a write pole flare point and a write pole flare length. The flare length may be beveled such that a tip of the write pole has a leading edge and a trailing edge. An exemplary angle of the bevel may be approximately 5-15 degrees, such that the width at the leading edge is less than the width at the trailing edge. The trapezoidal shape of the write tip minimized adjacent track interference when the write head is skewed at the outer and inner circular tracks of a rotating magnetic disk. In one implementation, the pole may be a high magnetic material such as cobalt (Co), Iron (Fe) or Nickel (Ni) or their alloys.

The shield may be aligned with the side and trailing edges of the write pole. In one implementation, the shield may be a high magnetic material such as Nickel Iron. The shield aligned with the side and trailing edges of the write pole is adapted to achieve a desired effective flux field having an improved field gradient. The portion of the shield aligned with the trailing edge of the write pole is adapted to improve transitional sharpness (e.g., linear resolution) and permit higher coercive field media (e.g., high stability). Improved transitional sharpness and higher coercive field media enables increased areal densities in perpendicular magnetic recording.

In one embodiment, the shield is separated from the write pole by a spacer. In one implementation, the spacer may be a non-magnetic material such as aluminum oxide ($Al_2O_3$), Silicon Oxide ($SiO_2$), Silicon Nitride ($Si_3N_4$), Tungsten (W), ($SiO_xN_y$) or similar material. The spacer provides for aggressive alignment and separation of the side and trailing edges of the shield to the write pole. Alignment and separation of the shield to the side and trailing edges of the write pole by the spacer is adapted to achieve a desired effective flux field having an improved field gradient to write to high coercivity media while minimizing adjacent track interference (ATI).

It is appreciated that the above-described embodiments may readily be modified to provide a single-pole write head having self-aligned side shields, a self-aligned integral wrap-around side and trailing edge shield, or self-aligned side shields and separate trailing edge shield.

Accordingly, embodiments of the present invention advantageously provide a single-pole write head including a beveled write pole with a leading edge tapering and/or an aggressive flare-point throat height. Embodiments of the present invention advantageously provide a single-pole write head including a self-aligned side shields. Embodiments of the present invention may also advantageously provide trailing edge shield. Embodiments of the invention provide a single-pole write head for generating an flux field for perpendicular recording at densities between approximately 100 gigabit per square inch and 1 terabit per square inch or more. The flux field has an improved field gradient for minimizing adjacent track interference. Embodiments of the invention also advantageously provide a manufacturable method of constructing the write head in accordance with embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of fabricating a magnetic write head comprising:
    depositing a layer of magnetic material on a flux guide layer;
    depositing a first hard mask layer on said layer of magnetic material;
    depositing a second hard mask layer on said first hard mask layer;
    depositing a third hard mask layer on said second hard mask layer;
    depositing a photo-resist layer upon said third hard mask layer;
    patterning said photo-resist layer to define a write pole;
    reactive ion etching said third hard mask layer exposed by said pattern photo-resist layer wherein a third hard mask defining said write pole is formed;
    reactive ion etching said second hard mask layer and said first hard mask layer exposed by said patterned third hard mask wherein a first hard mask and second hard mask defining said write pole is formed;
    ion milling said layer of magnetic material exposed by said second hard mask and said first hard mask wherein a beveled write pole is formed;
    forming a conformal spacer upon a portion of a flare length proximate a tip of said beveled write pole; and
    forming a shield layer upon said conformal spacer adjacent said flare length proximate said tip of said beveled write pole.

2. The method according to claims 1, further comprising sweeping and rotating said ion milling to control a trailing edge width of said beveled write pole.

3. The method according to claim 1, further comprising sweeping and rotating said ion milling to control a flare point of said beveled write pole.

4. The method according to claim 1, further comprising:
    depositing a second resist layer upon said write pole; and
    patterning said second resist layer to expose said flare length proximate said tip of said write pole wherein said conformal spacer is defined.

5. The method according to claim 1, wherein forming said conformal spacer includes depositing a non-conductive material utilizing a deposition process selected from the group consisting of chemical vapor deposition, atomic layer deposition, pulsed-atomic layer deposition, low-pressure chemical vapor deposition, plasma enhanced chemical vapor deposition, and high-density plasma deposition.

6. The method according to claim 5, wherein said conformal spacer includes said non-conductive material selected from the group consisting of aluminum oxide, silicon oxide, silicon nitride, tungsten, and silicon oxynitride.

7. The method according to claim 1, wherein:
    said first hard mask layer includes a layer of carbon;
    said second hard mask layer includes a layer of polyimide; and
    said third hard mask layer includes a layer of oxide.

8. The method according to claim 7, wherein:
    said reactive ion etching said third hard mask layer utilizes a fluorine-carbon based chemistry; and
    said reactive ion etching said second hard mask layer and said first hard mask layer utilizes an oxygen-carbon based chemistry.

* * * * *